United States Patent
Tian

(10) Patent No.: US 12,115,511 B2
(45) Date of Patent: Oct. 15, 2024

(54) PRODUCTION APPARATUS FOR HYDROTHERMAL SYNTHESIS OF LITHIUM IRON PHOSPHATE

(71) Applicant: SHENZHEN WARRANT NEW ENERGY CO., LTD., Shenzhen (CN)

(72) Inventor: Yihong Tian, Shenzhen (CN)

(73) Assignee: SHENZHEN WARRANT NEW ENERGY CO., LTD., Shenzhen (CN)

( * ) Notice: Subject to any disclaimer, the term of this patent is extended or adjusted under 35 U.S.C. 154(b) by 0 days.

(21) Appl. No.: 18/621,121

(22) Filed: Mar. 29, 2024

(65) Prior Publication Data

US 2024/0238751 A1 Jul. 18, 2024

Related U.S. Application Data

(63) Continuation of application No. PCT/CN2022/107760, filed on Jul. 26, 2022.

(30) Foreign Application Priority Data

Apr. 29, 2022 (CN) .......................... 202210483148.X

(51) Int. Cl.
| | | |
|---|---|---|
| *B01J 19/18* | (2006.01) | |
| *B01J 19/00* | (2006.01) | |
| *C01B 25/45* | (2006.01) | |

(52) U.S. Cl.
CPC ....... *B01J 19/1862* (2013.01); *B01J 19/0013* (2013.01); *B01J 19/0066* (2013.01);
(Continued)

(58) Field of Classification Search
CPC .... B01J 19/00; B01J 19/0006; B01J 19/0013; B01J 19/0053; B01J 19/0066; B01J 19/18;
(Continued)

(56) References Cited

U.S. PATENT DOCUMENTS

| | | |
|---|---|---|
| 2015/0311521 A1 | 10/2015 | Ryu et al. |
| 2016/0268593 A1 | 9/2016 | Vogler et al. |
| 2017/0324078 A1* | 11/2017 | Wang ...................... C01B 25/45 |

FOREIGN PATENT DOCUMENTS

| | | |
|---|---|---|
| CN | 103260742 A | 8/2013 |
| CN | 203781852 | 8/2014 |

(Continued)

OTHER PUBLICATIONS

Notification to Grant Patent Right for Invention, Chinese Application No. 202210483148.X, mailed Jan. 2, 2024 (8 pages).
CNIPA, Office Action issued for Chinese Application No. 202210483148.X, mailed Jun. 27, 2023 (13 pages).

*Primary Examiner* — Natasha E Young

(57) ABSTRACT

The present invention relates to a production apparatus for hydrothermal synthesis of lithium iron phosphate, which comprises first stirring devices, a preheating device, a second stirring device, and a drying device, wherein there are two first stirring devices, and the preheating device comprises a housing, a heating box, two feeding pumps, two first transfer assemblies, and several first heating tubes; the two first transfer assemblies each comprise an inlet pipe, an outlet pipe, and several transfer branch tubes. In the present application, the arrangement of multiple transfer branch tubes increases the heated area of the slurry, enhances the thermal conduction efficiency, and improves the heating effect. The equidistant arrangement of the transfer branch tubes ensures uniform heating of the slurry within the multiple transfer branch tubes, guaranteeing the heating effect. The arrangement of the preheating device can reduce the heating time of the slurry, thereby enhancing the heating effect.

8 Claims, 12 Drawing Sheets

(52) U.S. Cl.
CPC ....... *C01B 25/45* (2013.01); *B01J 2219/0006* (2013.01); *B01J 2219/00063* (2013.01); *B01J 2219/00069* (2013.01); *B01J 2219/00092* (2013.01); *B01J 2219/00155* (2013.01); *B01J 2219/00247* (2013.01)

(58) Field of Classification Search
CPC ................ B01J 19/1868; B01J 19/1862; B01J 2219/00; B01J 2219/00049; B01J 2219/00051; B01J 2219/00054; B01J 2219/00056; B01J 2219/00058; B01J 2219/0006; B01J 2219/00063; B01J 2219/00069; B01J 2219/00074; B01J 2219/00087; B01J 2219/00092; B01J 2219/0015; B01J 2219/00155; B01J 2219/00245; B01J 2219/00247; C01B 25/00; C01B 25/16; C01B 25/26; C01B 25/45

See application file for complete search history.

(56) References Cited

FOREIGN PATENT DOCUMENTS

| | | |
|---|---|---|
| CN | 203781852 U | 8/2014 |
| CN | 104555975 A | 4/2015 |
| CN | 104986796 A | 10/2015 |
| CN | 216132208 U | 3/2022 |
| CN | 217288415 U | 8/2022 |
| WO | WO-2015139526 A1 * | 9/2015 ............ B01J 19/006 |

* cited by examiner

PRODUCTION APPARATUS FOR HYDROTHERMAL SYNTHESIS OF LITHIUM IRON PHOSPHATE

CROSS-REFERENCE TO RELATED APPLICATIONS

This application is a continuation of PCT/CN2022/107760, now WO 2023/206834, filed Jul. 26, 2022, which claims benefit of Chinese Application No. CN202210483148.X, filed Apr. 29, 2022, both of which are incorporated herein by reference in their entirety.

TECHNICAL FIELD

The present invention relates to the field of lithium battery raw material preparation technologies, in particular to a production apparatus for hydrothermal synthesis of lithium iron phosphate.

BACKGROUND

Lithium iron phosphate with an olivine structure has garnered significant attention in the field of secondary lithium-ion batteries due to its safety, low cost, and environmental friendliness. In the prior art, the technical route for synthesizing lithium iron manganese phosphate can be broadly categorized into two types. One is a solid-phase method, of which the fundamental principle is the occurrence of solid-phase synthesis reactions between particles of solid reactants at high temperatures through surface diffusion. However, there is room for improvement in controlling the particles and ensuring batch stability of the products. The other is a liquid-phase method, in which the first slurry is obtained by mixing lithium phosphate and water, and the second slurry is obtained by mixing ferrous sulfate, manganese sulfate, and water. The two slurries are then mixed and heated, and finally, the synthesis of the two slurries is dried to obtain the lithium iron manganese phosphate powder. Nevertheless, in existing apparatuses, the typical method involves mixing the slurries in a reactor and simultaneously heating the slurries during the mixing. This process often results in insufficient heating of the slurries, and suboptimal thermal conductivity efficiency during the heating.

SUMMARY

In view of this, it is necessary to provide a production apparatus for hydrothermal synthesis of lithium iron phosphate to address the issues in the prior art.

To solve the issues in the prior art, the present invention adopts the following technical solutions:

Provided is a production apparatus for hydrothermal synthesis of lithium iron phosphate, comprising first stirring devices, a preheating device, a second stirring device, and a drying device, wherein there are two first stirring devices, and the preheating device comprises a housing, a heating box, two feeding pumps, two first transfer assemblies, and several first heating tubes, wherein the housing is positioned between the two first stirring devices and the second stirring device; the heating box is fixedly connected to the interior of the housing and is made of a metal material with good thermal conductivity; the two first transfer assemblies each comprise an inlet pipe, an outlet pipe, and several transfer branch tubes, wherein the inlet pipe and the outlet pipe are both in a horizontal state and positioned at top and bottom of the heating box, respectively; the several transfer branch tubes are provided in a vertical state at equal distances and in parallel between the inlet pipe and the outlet pipe, and all the transfer branch tubes pass through the interior of the heating box; the inlet pipes of the two first transfer assemblies are communicated with the two first stirring devices, respectively; the two feeding pumps are positioned between the two first stirring devices and the inlet pipes of the two first transfer assemblies, respectively; the two outlet pipes are both communicated with the second stirring device; the several first heating tubes are all in a horizontal state and pass through the interior of the heating box.

Preferably, second transfer assemblies are provided next to the two first transfer assemblies, the second transfer assemblies being structurally identical to the first transfer assemblies; a cleaning assembly is provided next to the housing, and the cleaning assembly comprises a water storage tank, an inflow tube, an outflow tube, a waste water tank, four first reversing valves, and four second reversing valves, wherein the four first reversing valves are respectively sleeved onto the inlet pipes of the two first transfer assemblies and the two second transfer assemblies, at the end near the first stirring device; the water storage tank is positioned next to the first stirring device; one end of the inflow tube is communicated with the water storage tank, with the other end of the inflow tube extending to below the four first reversing valves, and the four first reversing valves are all communicated with the inflow tube; the four second reversing valves are respectively sleeved onto the outlet pipes of the two first transfer assemblies and the two second transfer assemblies, at an end near the second stirring device; the waste water tank is positioned next to the second stirring device; one end of the outflow tube is communicated with the waste water tank, with the other end of the outflow tube extending to below the four second reversing valves, and the four second reversing valves are all communicated with the outflow tube.

Preferably, detection assemblies are provided on both of the two first transfer assemblies and the two second transfer assemblies, and all the detection assemblies comprise four temperature sensors, four third reversing valves, four one-way valves, and four reflux tubes, wherein the four temperature sensors are respectively sleeved onto the outlet pipes of the two first transfer assemblies and the two second transfer assemblies, at the end near the second stirring device; the four third reversing valves are sleeved next to the temperature sensors; the four reflux tubes are all in a vertical state and respectively sleeved above the four third reversing valves; the four one-way valves are sleeved on top ends of the four reflux tubes, and the other ends of the four one-way valves are communicated with the inlet pipes of the two first transfer assemblies and the two second transfer assemblies, at an end distal to the first stirring device.

Preferably, the heating box comprises four heating modules, wherein the four heating modules are provided in parallel inside the housing; two first heating tubes are provided within each heating module; the transfer branch tubes of the two first transfer assemblies and the two second transfer assemblies are respectively positioned between the two first heating tubes of the four heating modules.

Preferably, a pressure relief assembly is provided on both of the two first transfer assemblies and the two second transfer assemblies, and the pressure relief assembly comprises an exhaust tube, a waste gas tank, a pressure relief valve, and four connecting tubes, wherein the four connecting tubes are respectively positioned between the outlet pipes of the two first transfer assemblies and the two second transfer assemblies, and the second stirring device; the exhaust tube is provided in a horizontal state above the four connecting tubes, and the four connecting tubes are all communicated with the exhaust tube; the waste gas tank is positioned next to the housing; the exhaust tube is communicated with the waste gas tank.

Preferably, support frames are provided at both top and bottom of the housing, the heating box is fixedly connected to the support frames, and the housing is made of a thermal insulating material.

Preferably, a flow meter is provided on each inlet pipe of the two first transfer assemblies and the two second transfer assemblies, at the end near the first stirring device.

Preferably, a rotating drive motor is provided on respective top of the first stirring device and the second stirring device; a rotating shaft arranged in a vertical state is provided below each rotating drive motor of the first stirring device and the second stirring device, and the rotating shaft is in transmission connection with the rotating drive motor; several stirring blades surrounding an axis of the rotating shaft are provided on each rotating shaft of the first stirring device and the second stirring device.

Preferably, several second heating tubes surrounding a central line of the second stirring device are further provided within the second stirring device.

Preferably, the second stirring device is provided with a discharge tube in communication with the drying device; a filter screen is provided within the drying device; a liquid outlet tube is provided below the filter screen.

Compared with the prior art, the advantageous effects of the present application are as follows:

1. In the present application, the arrangement of multiple transfer branch tubes increases the heated surface area of the slurry, enhances the thermal conduction efficiency, and improves the heating effect. The equidistant arrangement of the transfer branch tubes ensures uniform heating of the slurry within the multiple transfer branch tubes, guaranteeing the heating effect. The arrangement of the preheating device can reduce the heating time of the slurry, thereby enhancing the heating effect.

2. In the present application, the second transfer assembly is provided to be structurally identical to the first transfer assembly. Continuous and uninterrupted slurry transfer can be achieved without waiting for the cleaning process, improving the efficiency of the apparatus. Additionally, the cleaning can extend the service life of the first transfer assembly or the second transfer assembly.

3. In the present application, the arrangement of the detection device enhances the heating effect of the slurry and facilitates the subsequent mixing of two slurries in the second stirring device.

4. In the present application, four heating modules are provided, enabling separate heating for the two first transfer assemblies and the two second transfer assemblies and reducing power consumption. There are two first heating tubes within each heating module, and the transfer branch tubes of the first transfer assemblies and the second transfer assemblies are positioned between two first heating tubes, which enables uniform heating within the transfer branch tubes of the first transfer assemblies and the second transfer assemblies, thereby enhancing the heating efficiency.

5. In the present application, the arrangement of the pressure relief assembly enables the adjustment of the pressure within the two first transfer assemblies and the two second transfer assemblies, thereby prolonging the service life of the apparatus. The collection of the waste gas produced by the slurry can reduce potential safety hazards.

6. In the present application, the housing is made of a thermal insulating material, providing thermal insulation for the heating box. This reduces the heating power consumption and ensures the heating effect.

7. In the present application, flow meters are provided to control the flow of slurry into the first transfer assembly and the second transfer assembly. This control can enhance the heating efficiency of the first heating tube for the transfer branch tubes of the first transfer assembly and the second transfer assembly and facilitate the control of slurry temperature.

8. In the present application, the drying device is provided with the filter screen and the liquid outlet tube, enabling the drying device to filter and simultaneously dry the product, enhancing production efficiency.

Figure 1:
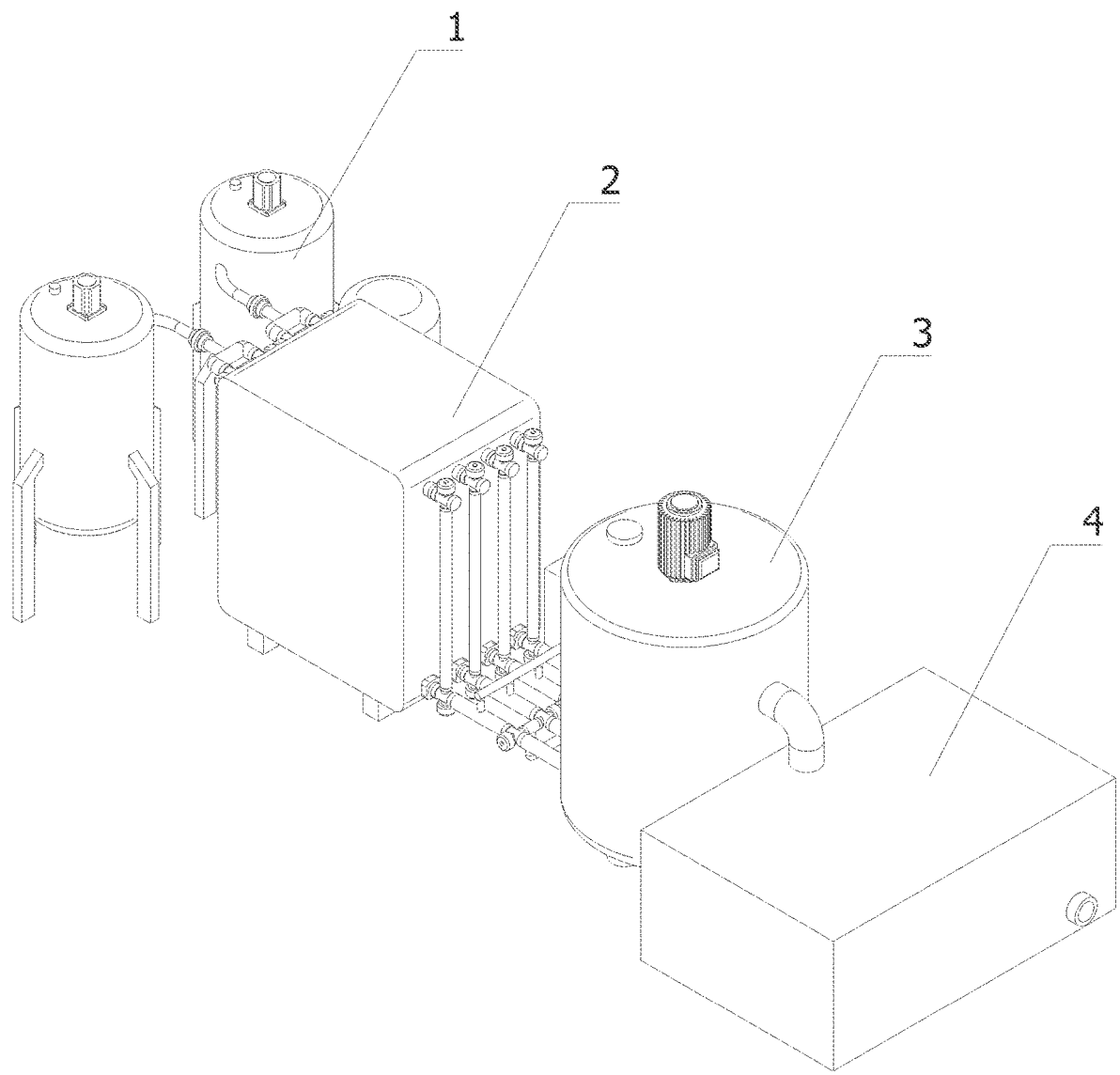
FIG. 1 is a schematic three-dimensional diagram of the overall structure of the present application.
Figure 2:
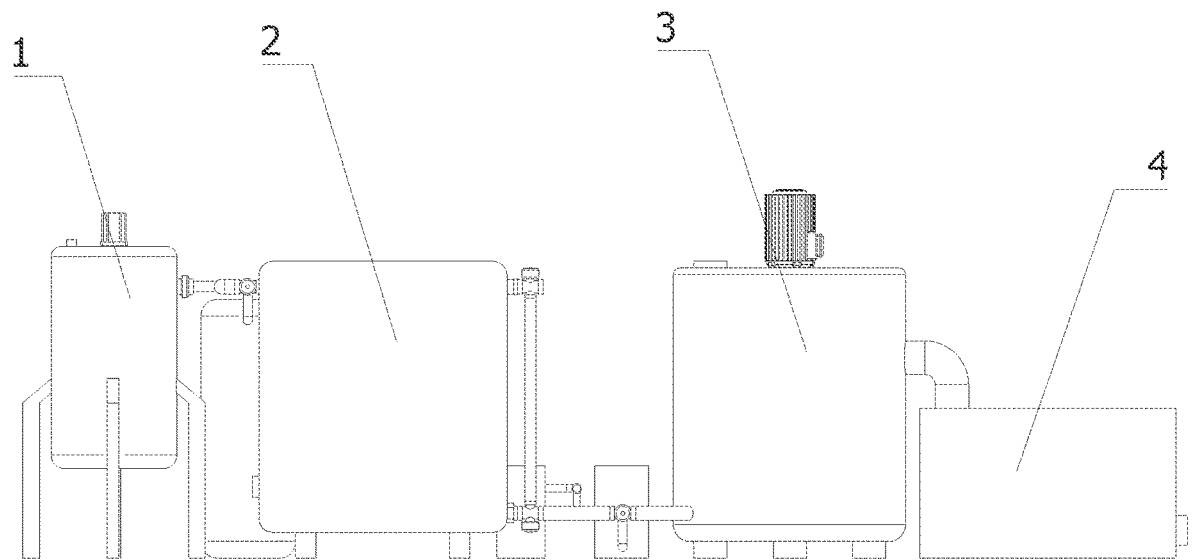
FIG. 2 is an overall front view of the present application.
Figure 3:
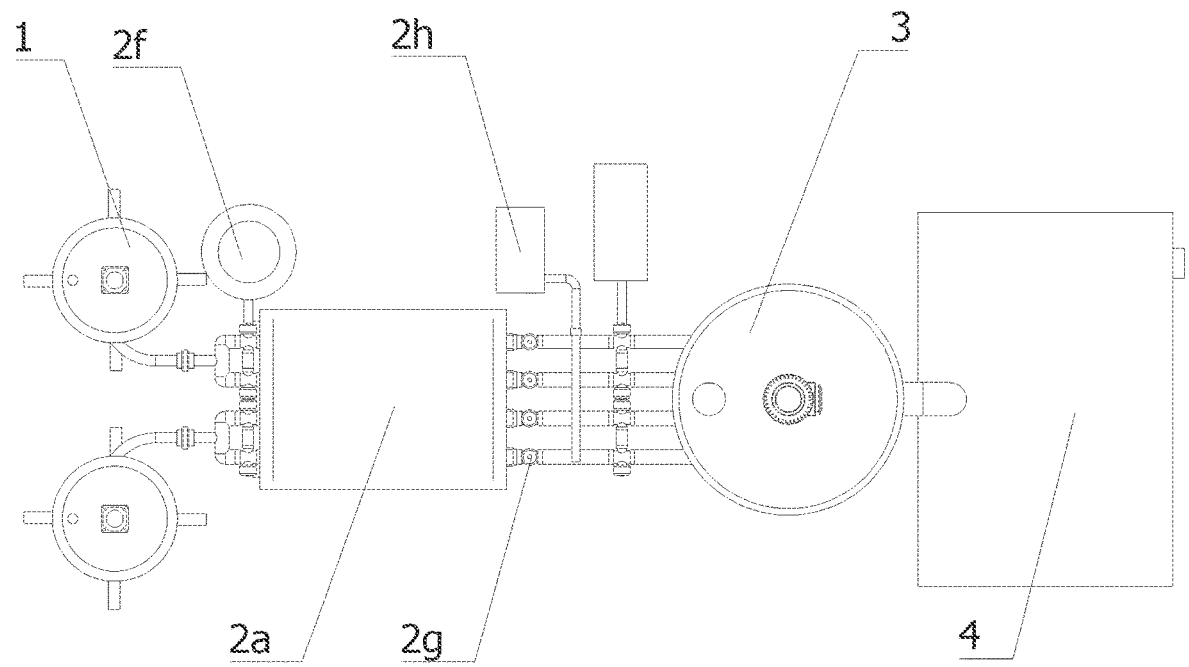
FIG. 3 is an overall top view of the present application.
Figure 4:
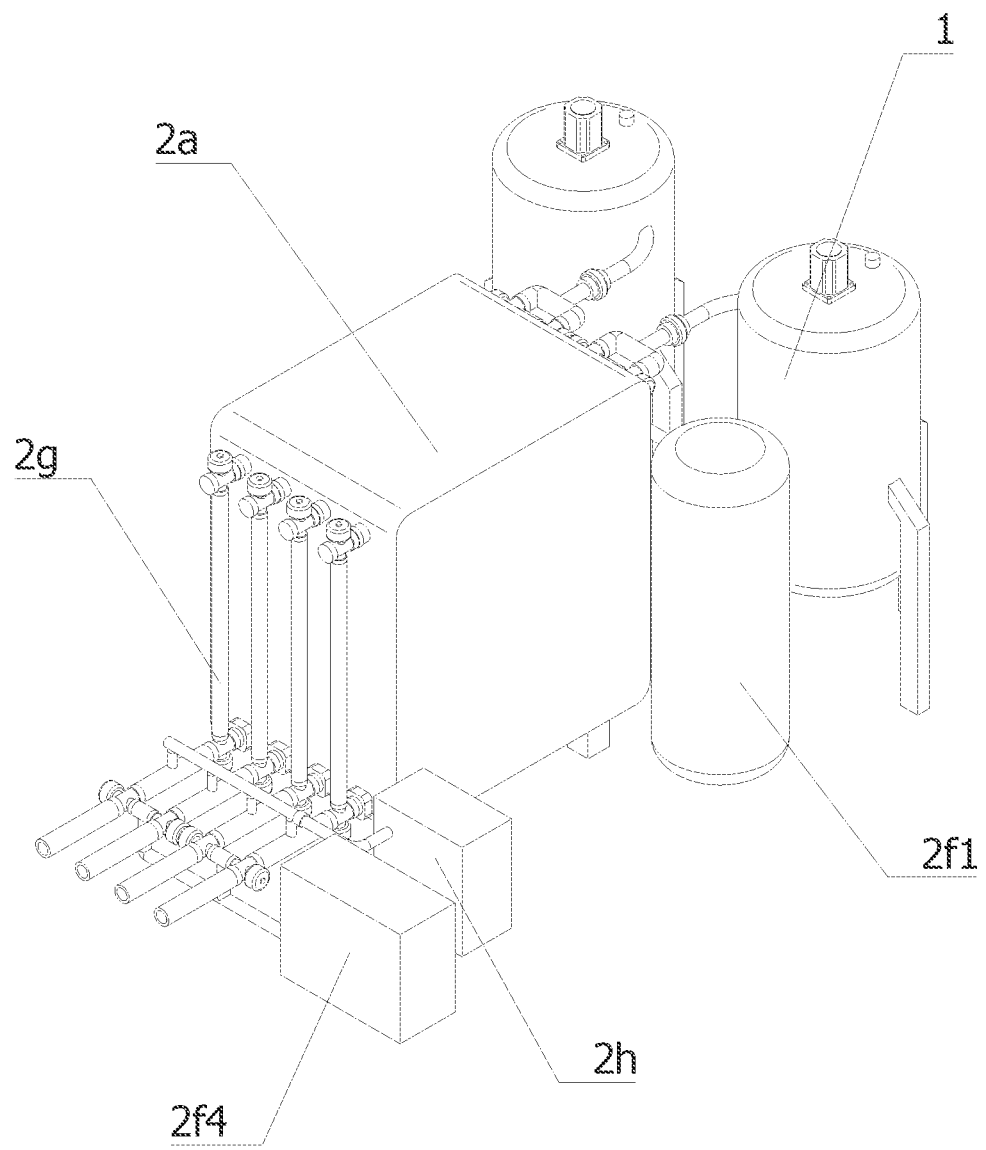
FIG. 4 is a schematic three-dimensional diagram of the structure of a preheating device of the present application.
Figure 5:
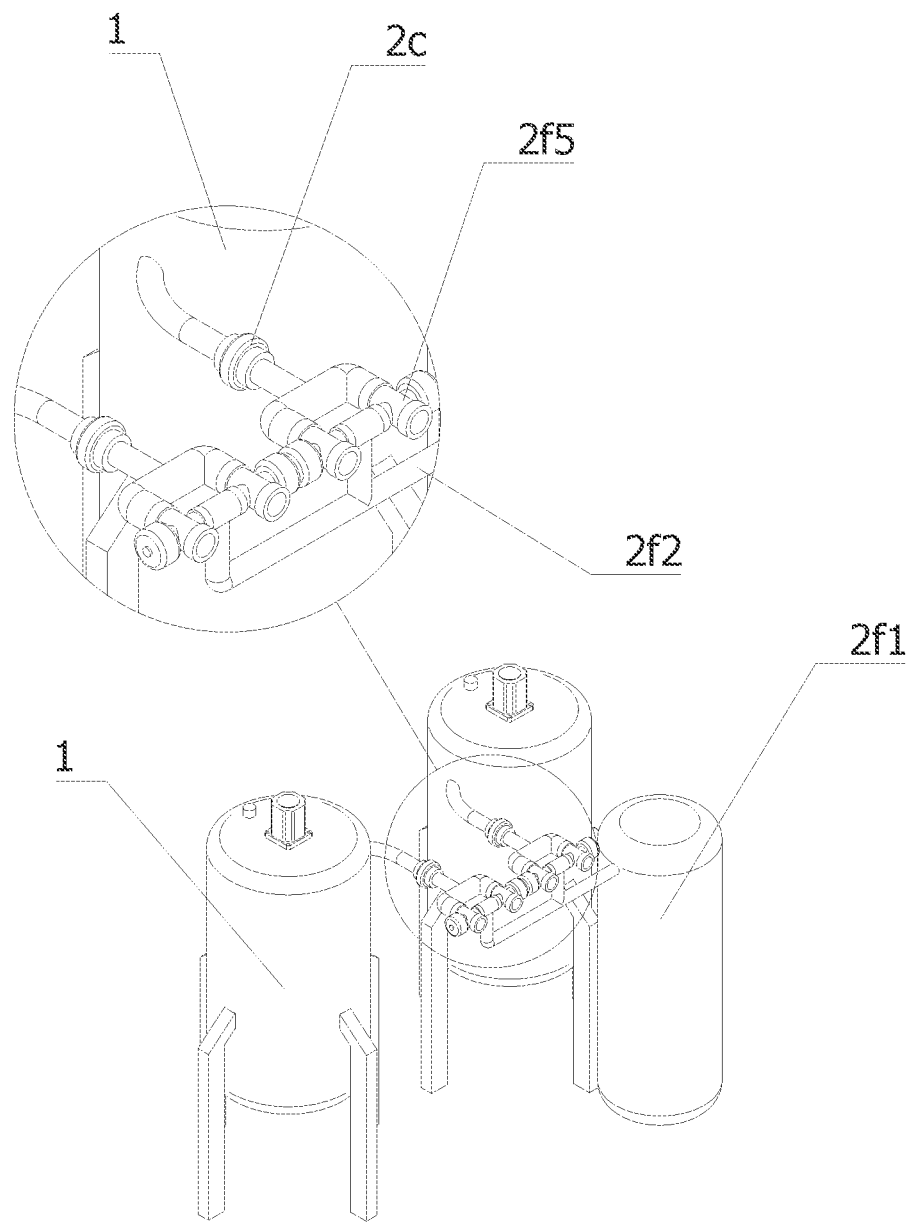
FIG. 5 is a schematic three-dimensional diagram of the partial structure of a first stirring device and a cleaning assembly of the present application, along with an enlarged view in the figure.
Figure 6:
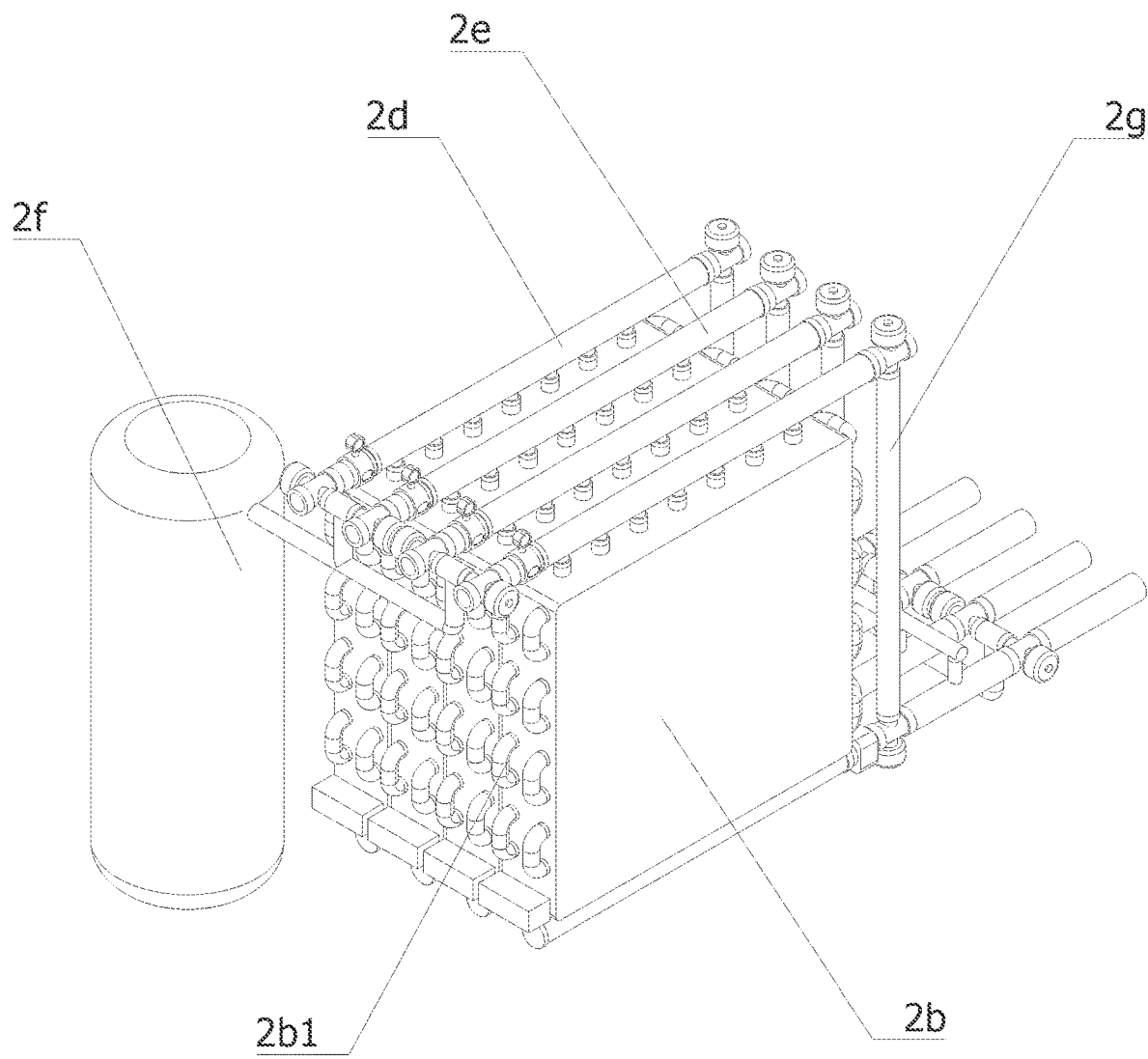
FIG. 6 is a schematic three-dimensional diagram of the interior structure of the preheating device of the present application.

The reference numbers in the figures are as follows:
- 1—First stirring device; 1a—Rotating drive motor; 1b—Rotating shaft; 1c—Stirring blade;
- 2—Preheating device; 2a—Housing; 2a1—Support frame; 2b—Heating box; 2b1—First heating tube; 2b2—Heating module; 2c—Feeding pump; 2d—First transfer assembly; 2d1—Inlet pipe; 2d2—Outlet pipe; 2d3—Transfer branch tube; 2d4—Flow meter; 2e—Second transfer assembly; 2f—Cleaning assembly; 2f1—Water storage tank; 2f2—Inflow tube; 2f3—Outflow tube; 2f4—Waste water tank; 2f5—First reversing valve; 2f6—Second reversing valve; 2g—Detection assembly; 2g1—Temperature sensor; 2g2—Third reversing valve; 2g3—One-way valve; 2g4—Reflux tube; 2h—Pressure relief assembly; 2h1—Exhaust tube; 2h2—Waste gas tank; 2h3—Pressure relief valve; 2h4—Connecting tube;

3—Second stirring device; 3a—Second heating tube; 3b—Discharge tube; 4—Drying device; 4a—Filter screen; 4b—Liquid outlet tube.

DETAILED DESCRIPTION

For a better understanding of the features, technical means, and specific objectives and functions achieved by the present invention, a further detailed description of the present invention is provided below in conjunction with the accompanying drawings and specific embodiments.

As shown in FIGS. 1 to 13, the present application provides:

Provided is a production apparatus for hydrothermal synthesis of lithium iron phosphate, comprising first stirring devices 1, a preheating device 2, a second stirring device 3, and a drying device 4. There are two first stirring devices 1, and the preheating device 2 comprises a housing 2a, a heating box 2b, two feeding pumps 2c, two first transfer assemblies 2d, and several first heating tubes 2b1. The housing 2a is positioned between the two first stirring devices 1 and the second stirring device 3, and the heating box 2b is fixedly connected to the interior of the housing 2a and is made of a metal material with good thermal conductivity. Each of the two first transfer assemblies 2d comprises an inlet pipe 2d1, an outlet pipe 2d2, and several transfer branch tubes 2d3. Both the inlet pipe 2d1 and the outlet pipe 2d2 are in a horizontal state and positioned at the top and the bottom of the heating box 2b, respectively; the several transfer branch tubes 2d3 are provided in a vertical state at equal distances and in parallel between the inlet pipe 2d1 and the outlet pipe 2d2, and all the transfer branch tubes 2d3 pass through the interior of the heating box 2b. The inlet pipes 2d1 of the two first transfer assemblies 2d are communicated with the two first stirring devices 1, respectively. The two feeding pumps 2c are positioned between the two first stirring devices 1 and the inlet pipes 2d1 of the two first transfer assemblies 2d. The two outlet pipes 2d2 are both communicated with the second stirring device 3. The several first heating tubes 2b1 are all in a horizontal state and pass through the interior of the heating box 2b.

Based on the above embodiment, the technical issue that the present application aims to address is how to improve the heating effect of the slurry in the synthesis of lithium iron phosphate. To address the issue, the present application employs two first stirring devices 1 to mix the raw materials for synthesizing lithium iron phosphate with water, resulting in two separate slurries. The two slurries are respectively conveyed to the interior of the two first transfer assemblies 2d of the preheating device 2 through two feeding pumps 2c. The slurries first enter the inlet pipes 2d1, which sequentially transfer the slurries to various transfer branch tubes 2d3. At this point, the first heating tube 2b1 is activated to raise its temperature. As the first heating tube 2b1 passes through the heating box 2b, and the heating box 2b is made of a metal material with good thermal conductivity, preferably made of copper or alloy aluminum, the heating box 2b absorbs heat from the first heating tube 2b1. The absorbed heat by the heating box 2b is then thermally conducted to various transfer branch tubes 2d3 passing through the interior of the heating box 2b, thereby heating the slurries within the transfer branch tubes 2d3. The arrangement of multiple transfer branch tubes 2d3 increases the heated surface area of the slurries, enhances the thermal conduction efficiency, and improves the heating effect. The equidistant arrangement of the transfer branch tubes 2d3 ensures uniform heating of the slurries within the multiple transfer branch tubes 2d3, guaranteeing the heating effect. The heated slurries are discharged from the transfer branch tubes 2d3 into the outlet pipes 2d2, and through the outlet pipes 2d2, the slurries are introduced into the second stirring device 3. After both slurries simultaneously enter the second stirring device 3, the second stirring device 3 stirs and mixes the two slurries. The mixed slurry is then introduced through the second stirring device 3 into the drying device 4, where the slurry is dried to yield powdered lithium iron phosphate, thus completing the synthesis of lithium iron phosphate. The arrangement of the preheating device 2 can reduce the heating time of the slurry, thereby enhancing the heating effect.

As shown in FIGS. 4 to 9, further details are as follows:

The second transfer assemblies 2e are provided next to the two first transfer assemblies 2d, the second transfer assemblies 2e being structurally identical to the first transfer assemblies 2d. A cleaning assembly 2f is provided next to the housing 2a, and the cleaning assembly 2f comprises a water storage tank 2f1, an inflow tube 2f2, an outflow tube 2f3, a waste water tank 2f4, four first reversing valves 2f5, and four second reversing valves 2f6. The four first reversing valves 2f5 are respectively sleeved onto the inlet pipes 2d1 of the two first transfer assemblies 2d and the two second transfer assemblies 2e, at the end near the first stirring device 1. The water storage tank 2f1 is positioned next to the first stirring device 1. One end of the inflow tube 2f2 is communicated with the water storage tank 2f1, with the other end of the inflow tube 2f2 extending to below the four first reversing valves 2f5, and the four first reversing valves 2f5 are all communicated with the inflow tube 2f2. The four second reversing valves 2f6 are respectively sleeved onto the outlet pipes 2d2 of the two first transfer assemblies 2d and the two second transfer assemblies 2e, at the end near the second stirring device 3. The waste water tank 2f4 is positioned next to the second stirring device 3. One end of the outflow tube 2f3 is communicated with the waste water tank 2f4, with the other end of the outflow tube 2f3 extending to below the four second reversing valves 2f6, and the four second reversing valves 2f6 are all communicated with the outflow tube 2f3.

Based on the above embodiment, after the slurry is transferred, the residual slurry within the first transfer assembly 2d needs to be cleaned to avoid the accumulation of dirt inside the first transfer assembly 2d over prolonged usage. However, during cleaning, the continuous transfer of slurry is not possible, requiring the machine to be stopped and waiting for cleaning. The technical issue that the present application aims to address is how to clean the first transfer assembly 2d without interrupting the transfer of slurry. To address the issue, in the present application, the second transfer assembly 2e is provided to be structurally identical to the first transfer assembly 2d, and the slurry is transferred by alternating between the first transfer assembly 2d and the second transfer assembly 2e, such that the transfer of the slurry will not be discontinued. While the first transfer assembly 2d is in the process of transmission, the internal cleaning of the second transfer assembly 2e is conducted, and vice versa. Clean water from the water storage tank 2f1 is introduced into the inflow tube 2f2, and the first reversing valves 2f5 of the first transfer assembly 2d and the second transfer assembly 2e are selected to communicate with the inflow tube 2f2, allowing clean water to clean the interior of the first transfer assembly 2d or the second transfer assembly 2e through which the slurry has passed. When the water flows to the terminal of the outlet pipe 2d2 of the first transfer assembly 2d or the second transfer assembly 2e, the waste water after cleaning is directed into the waste water tank 2f4 through the second reversing valve 2f6, completing the closed-loop. The waste water, collected in the waste water tank 2f4 after cleaning, will finally be filtered and discharged through an external filtration device. Simultaneously, the first transfer assembly 2d or the second transfer assembly 2e that has not been cleaned can continue to be communicated with the first stirring device 1 without waiting for the cleaning process. The continuous and uninterrupted slurry transfer improves the efficiency of the apparatus, and the cleaning can extend the service life of the first transfer assembly 2d or the second transfer assembly 2e.

As shown in FIGS. 3, 4, 6, 8, and 9, further details are as follows:

Detection assemblies 2g are provided on both of the two first transfer assemblies 2d and the two second transfer assemblies 2e, and all the detection assemblies 2g comprise four temperature sensors 2g1, four third reversing valves 2g2, four one-way valves 2g3, and four reflux tubes 2g4. The four temperature sensors 2g1 are respectively sleeved onto the outlet pipes 2d2 of the two first transfer assemblies 2d and the two second transfer assemblies 2e, at the end near the second stirring device 3. The four third reversing valves 2g2 are sleeved next to the temperature sensors 2g1. The four reflux tubes 2g4 are all in a vertical state and respectively sleeved above the four third reversing valves 2g2. The four one-way valves 2g3 are sleeved on the top ends of the four reflux tubes 2g4, and the other ends of the four one-way valves 2g3 are communicated with the inlet pipes 2d1 of the two first transfer assemblies 2d and the two second transfer assemblies 2e, at the end distal to the first stirring device 1.

Based on the above embodiment, the technical issue that the present application aims to address is how to ensure that the slurry transferred to the second stirring device 3 remains exactly within the required temperature range for the process. To address the issue, the present application employs temperature sensors 2g1 to detect the temperature of the slurry flowing from the outlet pipes 2d2 of either the first transfer assemblies 2d or the second transfer assemblies 2e toward the second stirring device 3. When the detected temperature falls outside the required temperature range for the process, the third reversing valves 2g2 are provided to direct the slurry into the reflux tubes 2g4 positioned above them. The one-way valves 2g3 are provided to ensure that the slurry can only flow back into the inlet pipes 2d1 of either the first transfer assemblies 2d or the second transfer assemblies 2e in a unidirectional manner. This allows the slurry to be redirected back into the outlet pipes 2d2 of either the first transfer assemblies 2d or the second transfer assemblies 2e. The temperature of the slurry is adjusted using the first heating tubes 2b1 until it falls within the required temperature range for the process. The arrangement of the detection device enhances the heating effect of the slurry and facilitates the subsequent mixing of two slurries in the second stirring device 3.

Figure 7:
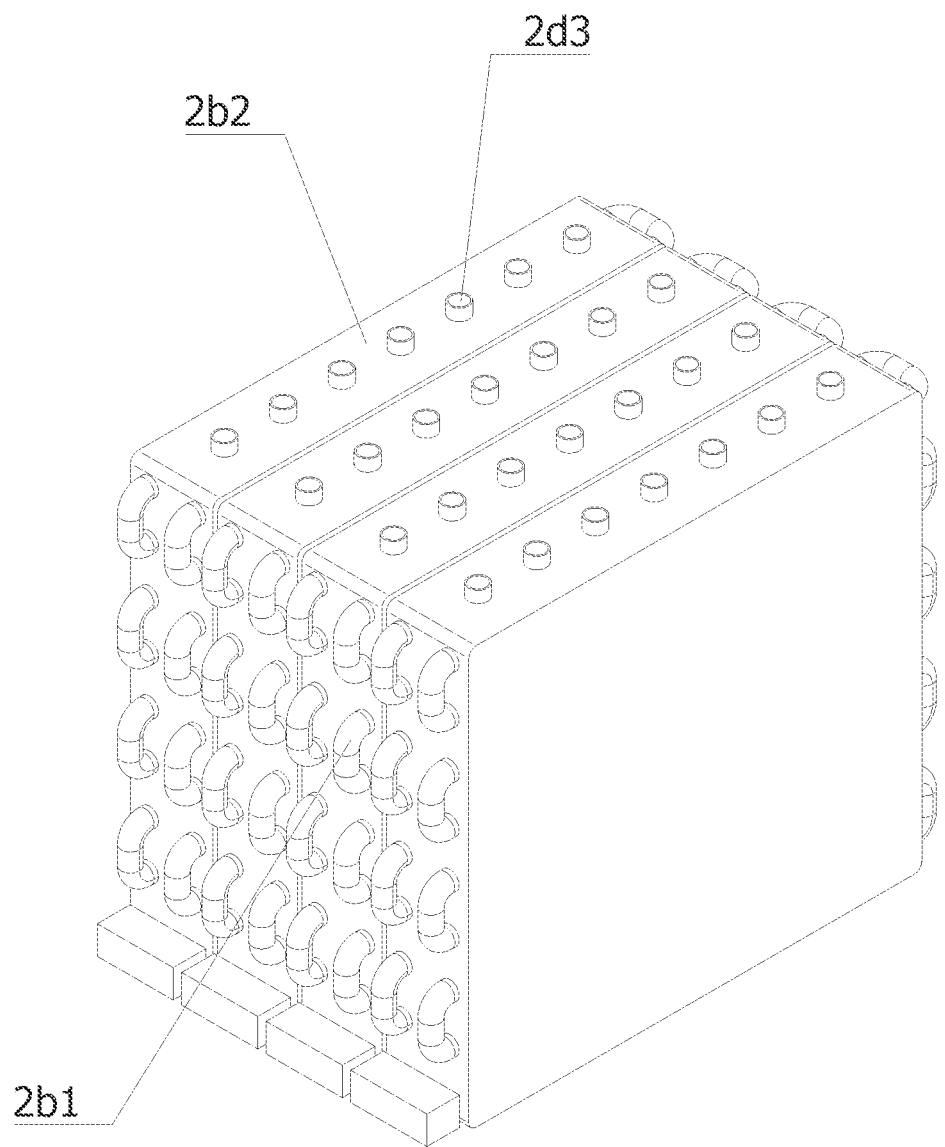
FIG. 7 is a schematic three-dimensional diagram of the structure of a heating box of the present application.

As shown in FIG. 7, further details are as follows:

The heating box 2b comprises four heating modules 2b2. The four heating modules 2b2 are provided in parallel inside the housing 2a. Two first heating tubes 2b1 are provided within each heating module 2b2. The transfer branch tubes 2d3 of the two first transfer assemblies 2d and the two second transfer assemblies 2e are respectively positioned between the two first heating tubes 2b1 of the four heating modules 2b2.

Based on the above embodiments, due to the alternating transfer of slurry by the two first transfer assemblies 2d and the two second transfer assemblies 2e, if the heating box 2b is provided as a whole, it would lead to unstable temperature control within the first transfer assemblies 2d and the second transfer assemblies 2e as they continue to be heated when cleaning the interior thereof. Simultaneously, it would result in significant power consumption. The technical issue that the present application aims to address is how to independently heat the two first transfer assemblies 2d and the two second transfer assemblies 2e. To address the issue, in the present application, four heating modules 2b2 are provided, enabling separate heating for the two first transfer assemblies 2d and the two second transfer assemblies 2e. This configuration reduces power consumption by closing the first heating tubes 2b1 within the heating modules 2b2 when one of the two first transfer assemblies 2d or the two second transfer assemblies 2e is in a cleaning state. There are two first heating tubes 2b1 within each heating module 2b2, and the transfer branch tubes 2d3 of the first transfer assemblies 2d and the second transfer assemblies 2e are positioned between two first heating tubes 2b1, which enables uniform heating within the transfer branch tubes 2d3 of the first transfer assemblies 2d and the second transfer assemblies 2e, thereby enhancing the heating efficiency.

Figure 8:
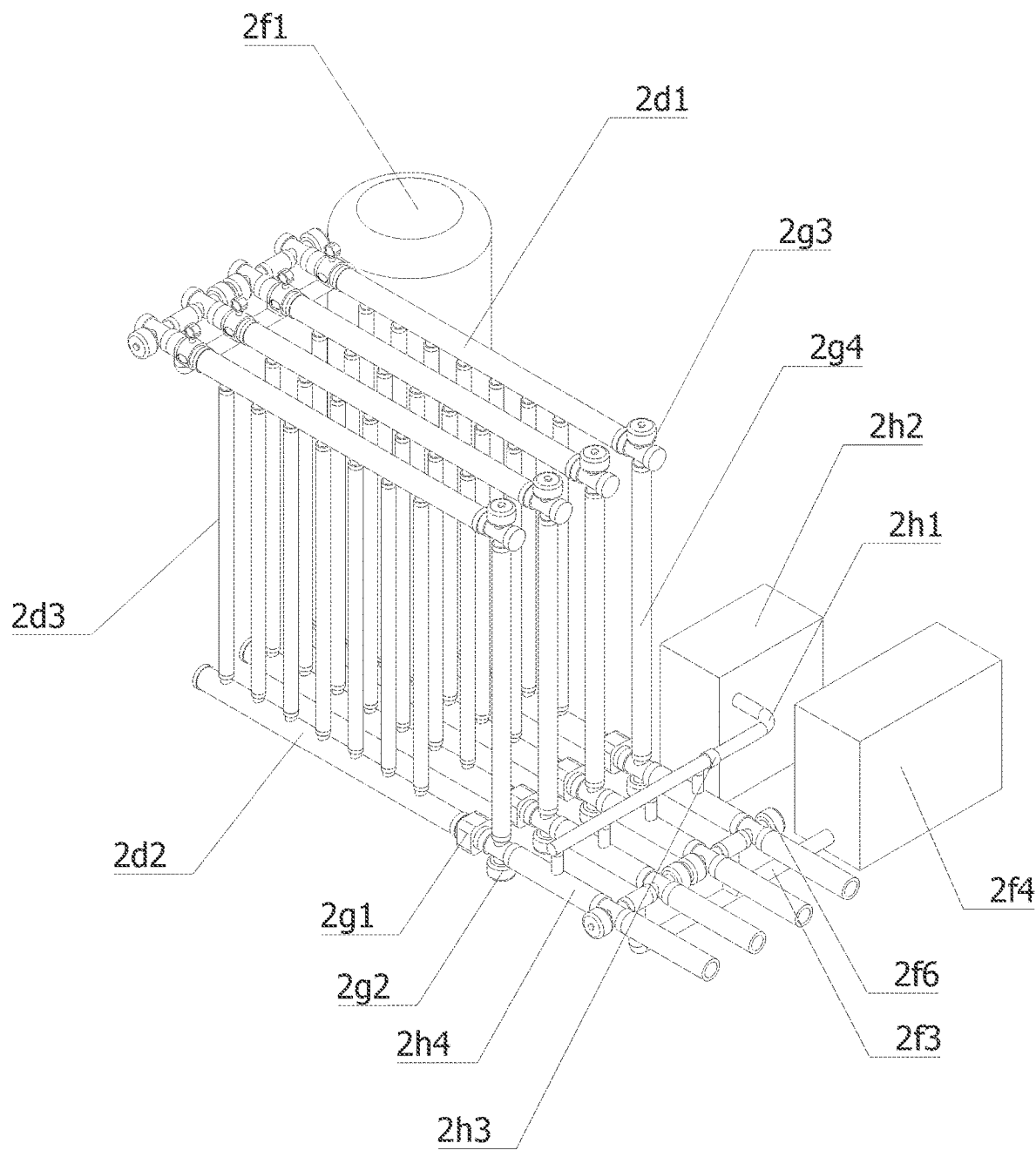
FIG. 8 is a schematic three-dimensional diagram of the partial structure of the preheating device of the present application.

As shown in FIG. 8, further details are as follows:

A pressure relief assembly 2h is provided on both of the two first transfer assemblies 2d and the two second transfer assemblies 2e. The pressure relief assembly 2h comprises an exhaust tube 2h1, a waste gas tank 2h2, a pressure relief valve 2h3, and four connecting tubes 2h4. The four connecting tubes 2h4 are respectively positioned between the outlet pipes 2d2 of the two first transfer assemblies 2d and the two second transfer assemblies 2e, and the second stirring device 3. The exhaust tube 2h1 is provided in a horizontal state above the four connecting tubes 2h4, and the four connecting tubes 2h4 are all communicated with the exhaust tube 2h1. The waste gas tank 2h2 is positioned next to the housing 2a. The exhaust tube 2h1 is communicated with the waste gas tank 2h2.

Based on the above embodiment, during the heating process of the two first transfer assemblies 2d and the two second transfer assemblies 2e, waste gas is generated. Failure to promptly discharge the waste gas can result in increased pressure inside the two first transfer assemblies 2d and the two second transfer assemblies 2e, affecting the service life of the apparatus. The technical issue that the present application aims to address is how to discharge the waste gas from the first transfer assemblies 2d and the second transfer assemblies 2e. To address the issue, in the present application, four connecting tubes 2h4 are provided. When the heated slurry flows to the connecting tubes 2h4, the waste gas generated by the heated slurry is collected by the overhead exhaust tube 2h1 and ultimately conveyed to the waste gas tank 2h2. The waste gas produced by the slurry is collected by the waste gas tank 2h2, and the slurry is transferred to the second stirring device 3 via the connecting tubes 2h4. The arrangement of the pressure relief valve 2h3 enables the adjustment of the pressure within the two first transfer assemblies 2d and the two second transfer assemblies 2e, thereby prolonging the service life of the apparatus and reducing potential safety hazards.

Figure 10:
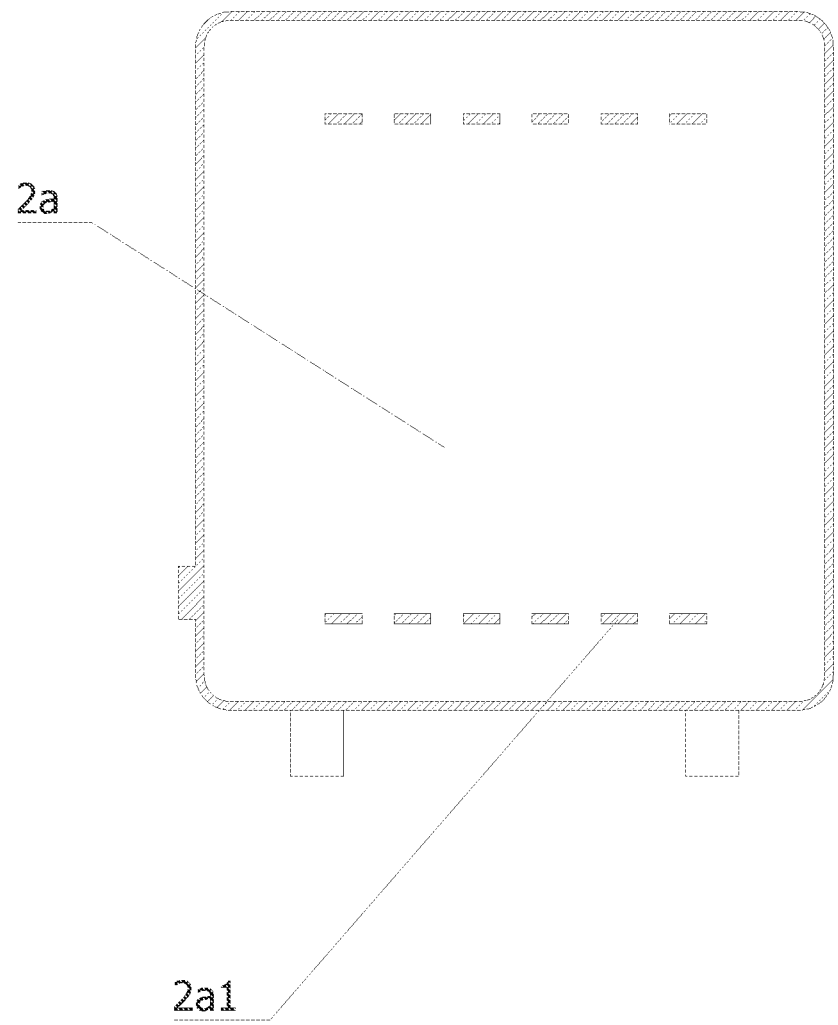
FIG. 10 is a schematic diagram of the cross-sectional structure of a housing of the present application.

As shown in FIG. 10, further details are as follows:

Support frames 2a1 are provided at both the top and the bottom of the housing 2a. The heating box 2b is fixedly connected to the support frames 2a1, and the housing 2a is made of a thermal insulating material.

Based on the above embodiments, the technical issue that the present application aims to address is how to reduce the heating power consumption. To address the issue, in the present application, the housing 2a is made of a thermal insulating material, providing thermal insulation for the heating box 2b. This reduces the heating power consumption and ensures the heating effect. The support frames 2a1 inside the housing 2a facilitate the installation of the heating box 2b.

Figure 9:
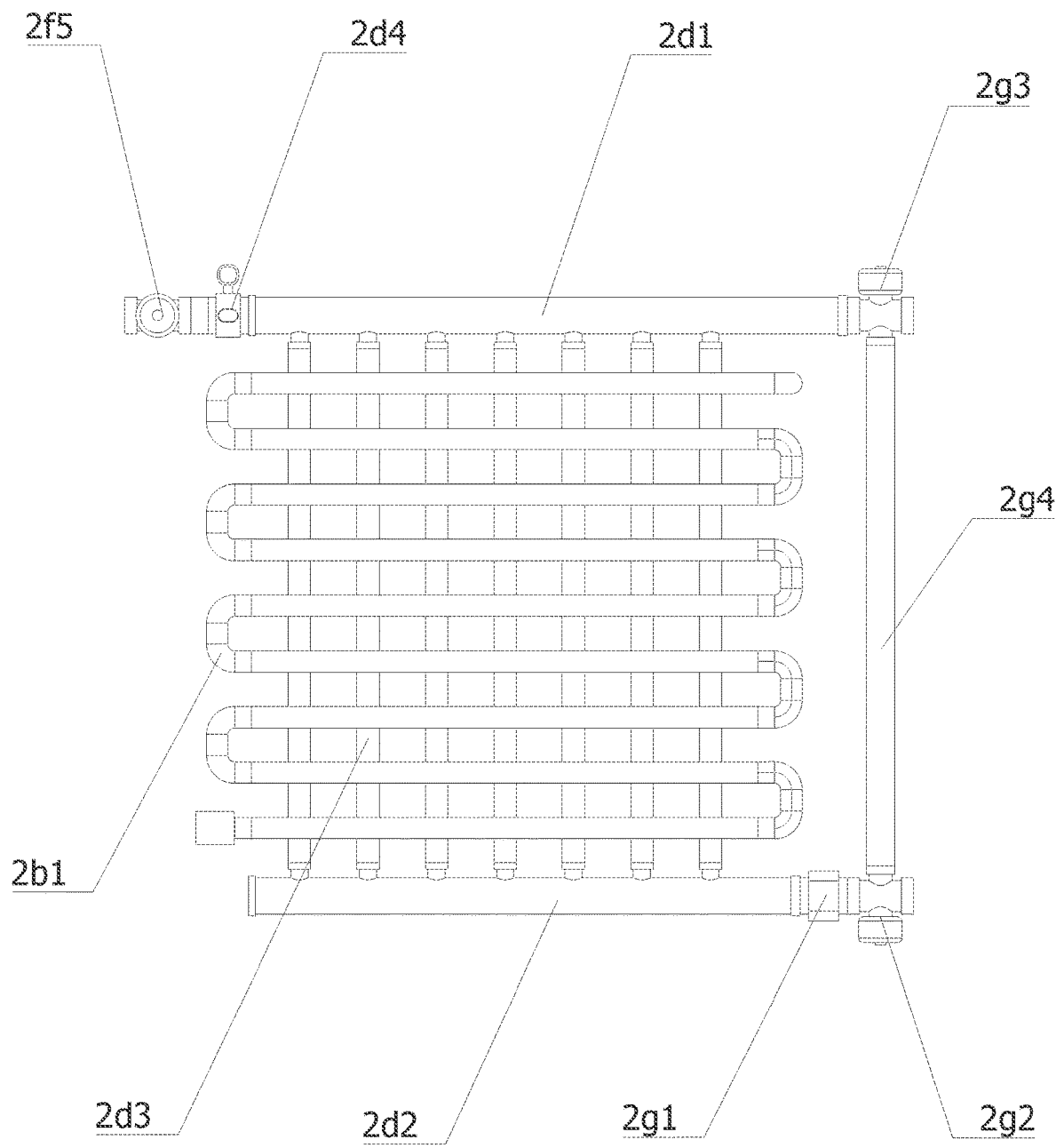
FIG. 9 is a front view of a first transfer assembly, a first heating tube, and a detection assembly of the present application.

As shown in FIG. 9, further details are as follows:

A flow meter 2d4 is provided on each inlet pipe 2d1 of the two first transfer assemblies 2d and the two second transfer assemblies 2e, at the end near the first stirring device 1.

Based on the above embodiments, the technical issue that the present application aims to address is how to control the flow of slurry into the first transfer assemblies 2d and the second transfer assemblies 2e. To address the issue, in the present application, flow meters 2d4 are provided to control the flow of slurry into the first transfer assembly 2d and the second transfer assembly 2e. This control can enhance the heating efficiency of the first heating tube 2b1 for the transfer branch tubes 2d3 of the first transfer assembly 2d and the second transfer assembly 2e and facilitate the control of slurry temperature.

Figure 11:
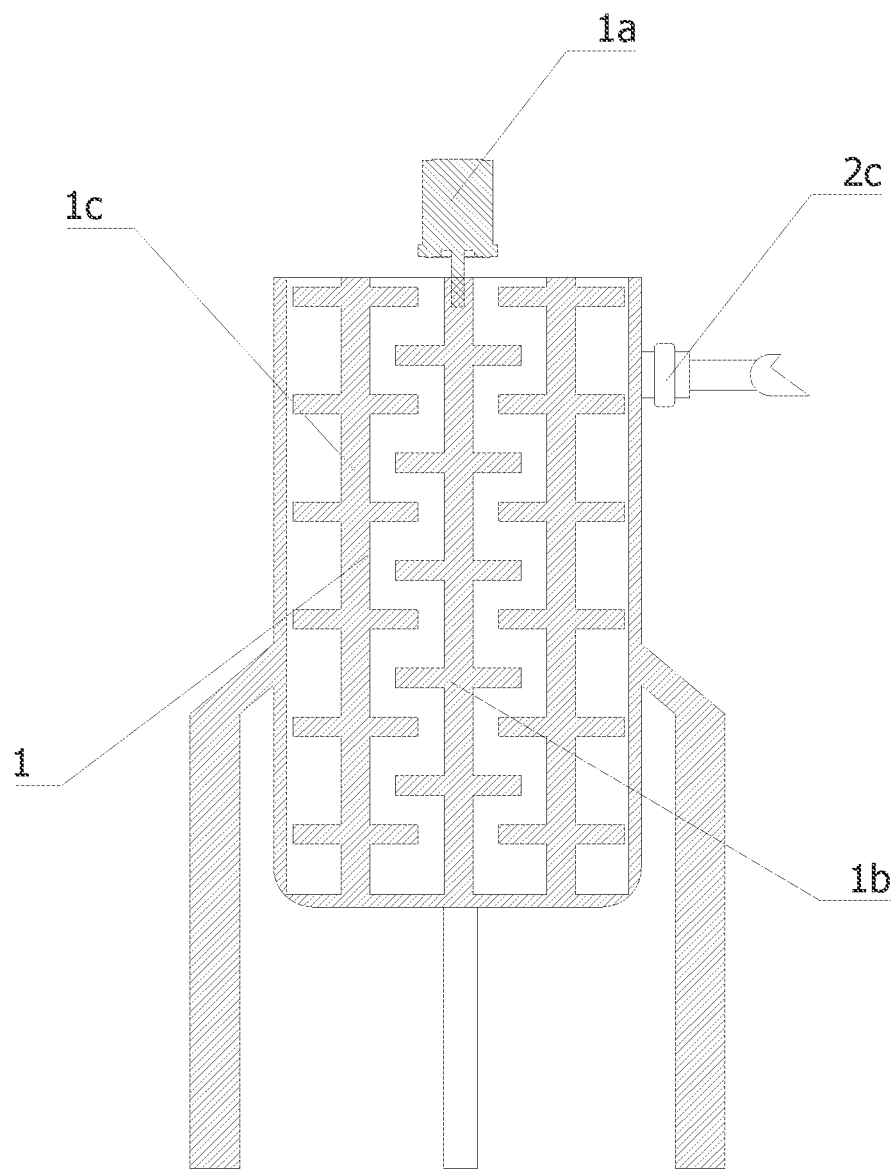
FIG. 11 is a schematic diagram of the cross-sectional structure of the first stirring device of the present application.
Figure 12:
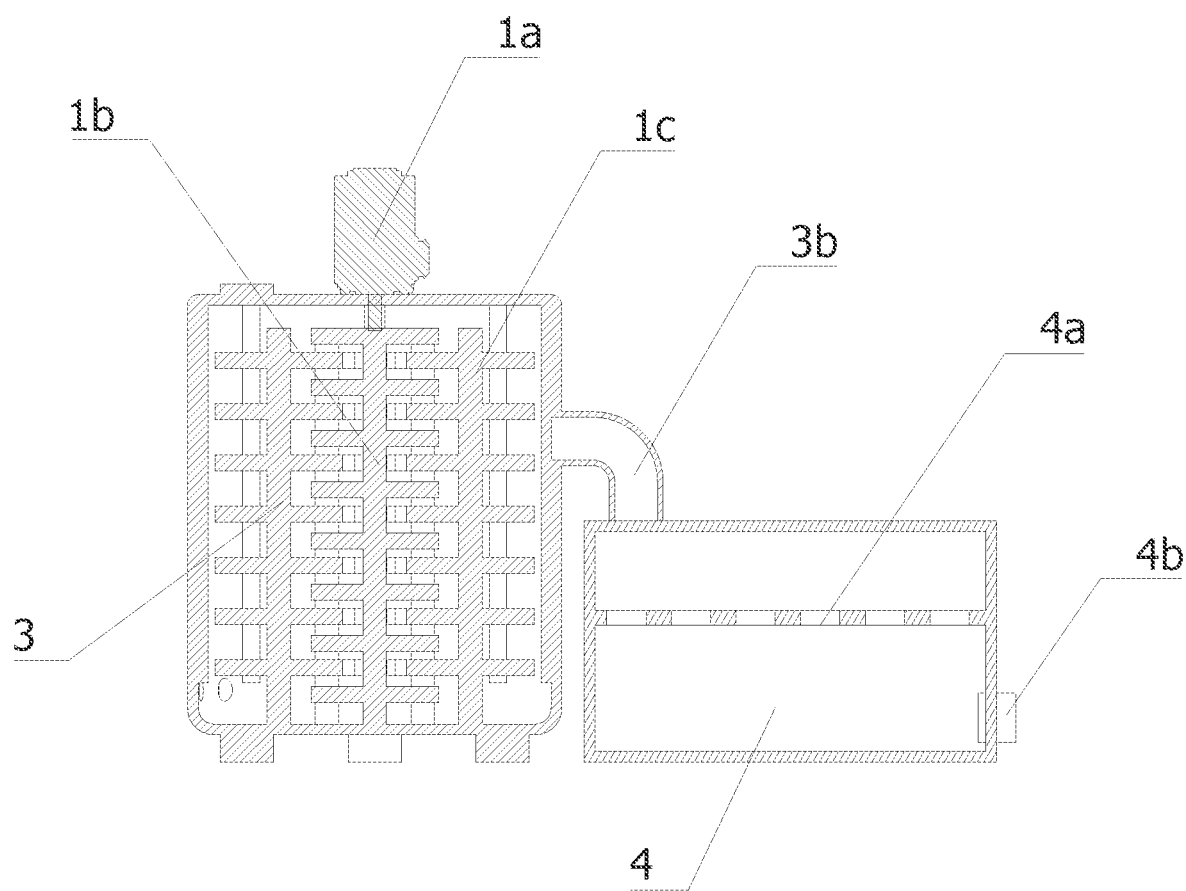
FIG. 12 is a schematic diagram of the cross-sectional structure of a second stirring device and a drying device of the present application.
Figure 13:
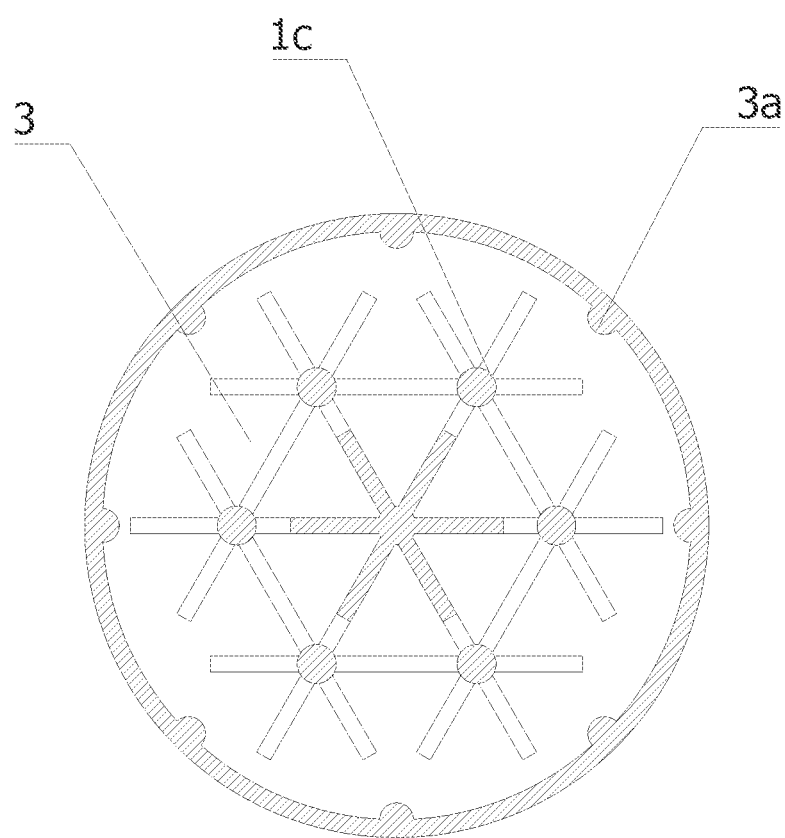
FIG. 13 is a schematic diagram of the cross-sectional structure of the second stirring device of the present application.

As shown in FIGS. 11 to 13, further details are as follows:

A rotating drive motor 1a is provided on the respective top of the first stirring device 1 and the second stirring device 3. A rotating shaft 1b arranged in a vertical state is provided below each rotating drive motor 1a of the first stirring device 1 and the second stirring device 3, and the rotating shaft 1b is in a transmission connection with the rotating drive motor 1a. Several stirring blades 1c surrounding the axis of the rotating shaft 1b are provided on each rotating shaft 1b of the first stirring device 1 and the second stirring device 3.

Based on the above embodiments, the technical issue that the present application aims to address is how the first stirring device 1 and the second stirring device 3 mix the raw materials. To address the issue, in the present application, the rotating drive motor 1a drives the rotation of the rotating shaft 1b, which subsequently drives the rotation of multiple stirring blades 1c. The stirring blades 1c effectively mix the raw materials within the first stirring device 1 and the second stirring device 3. Preferably, multiple rotating shafts 1b are provided inside the first stirring device 1 and the second stirring device 3. The multiple rotating shafts 1b may be connected by gears, and the stirring blades 1c on the multiple rotating shafts 1b are staggered, thereby enabling simultaneous rotation of the stirring blades 1c on the multiple rotating shafts 1b. Moreover, the rotation directions of the multiple rotating shafts 1b are opposite, enabling intense agitation of the slurry within the first stirring device 1 and the second stirring device 3. This design increases the contact area of the slurry within the first stirring device 1 and the second stirring device 3, enhancing the stirring efficiency.

As shown in FIG. 13, further details are as follows:

Several second heating tubes 3a surrounding the central line of the second stirring device 3 are further provided within the second stirring device 3.

Based on the above embodiments, while the second stirring device 3 is mixing the two slurries, the temperature of the slurries needs to be maintained. The technical issue that the present application aims to address is how to thermally insulate the slurry within the second stirring device 3. To address the issue, in the present application, second heating tubes 3a are provided to facilitate the heating of the slurry within the second stirring device 3, serving the purpose of thermal insulation and promoting the thorough reaction of the two slurries.

As shown in FIG. 12, further details are as follows:

The second stirring device 3 is provided with a discharge tube 3b communicated with the drying device 4. A filter screen 4a is provided within the drying device 4, and a liquid outlet tube 4b is provided below the filter screen 4a.

Based on the above embodiments, the product produced after the stirring by the second stirring device 3 requires filtration. The technical issue that the present application aims to address is how to filter and simultaneously dry the slurry produced by the second stirring device 3. To address the issue, the present application utilizes the discharge tube 3b to discharge the internal product into the drying device 4. The filter screen within the drying device 4 filters the product, and the filtered product is dried by the drying device 4, ultimately generating a powdered lithium iron phosphate. The liquid resulting from the filtration is discharged from the drying device 4 through the filter screen 4a and the liquid outlet tube 4b. An external device collects the filtered liquid, allowing for the recovery of lithium phosphate in the liquid and thus reducing the waste of production costs. The arrangement of the filter screen 4a and the liquid outlet tube 4b enables the drying device 4 to filter and simultaneously dry the product, enhancing production efficiency.

The above embodiments only illustrate one or several embodiments of the present invention. While these embodiments are described in a specific and detailed manner, they should not be understood as limiting the scope of the patent for the present invention. It should be noted that for those of ordinary skill in the art, several variations and improvements can be made without departing from the idea of the present invention. These variations and improvements are also within the protection scope of the present invention. Therefore, the protection scope of the present invention shall be subject to the appended claims.

What is claimed is:

1. A production apparatus for hydrothermal synthesis of lithium iron phosphate, comprising first stirring devices (1), a preheating device (2), a second stirring device (3), and a drying device (4), wherein there are two first stirring devices (1), and the preheating device (2) comprises a housing (2a), a heating box (2b), two feeding pumps (2c), two first transfer assemblies (2d), and several first heating tubes (2b1), wherein the housing (2a) is positioned between the two first stirring devices (1) and the second stirring device (3); the heating box (2b) is fixedly connected to the interior of the housing (2a) and is made of a metal material with good thermal conductivity; the two first transfer assemblies (2d) each comprise an inlet pipe (2d1), an outlet pipe (2d2), and several transfer branch tubes (2d3), wherein the inlet pipe (2d1) and the outlet pipe (2d2) are both in a horizontal state and positioned at top and bottom of the heating box (2b), respectively; the several transfer branch tubes (2d3) are provided in a vertical state at equal distances and in parallel between the inlet pipe (2d1) and the outlet pipe (2d2), and all the transfer branch tubes (2d3) pass through the interior of the heating box (2b); the inlet pipes (2d1) of the two first transfer assemblies (2d) are communicated with the two first stirring devices (1), respectively; the two feeding pumps (2c) are positioned between the two first stirring devices (1) and the inlet pipes (2d1) of the two first transfer assemblies (2d), respectively; the two outlet pipes (2d2) are both communicated with the second stirring device (3); the several first heating tubes (2b1) are all in a horizontal state and pass through the interior of the heating box (2b);

second transfer assemblies (2e) are provided next to the two first transfer assemblies (2d), a flow meter (2d4) is provided on each inlet pipe (2*d*1) of the two first transfer assemblies (2*d*) and the two second transfer assemblies (2*e*), at an end near the first stirring device (1);

support frames (2*a*1) are provided at both top and bottom of the housing (2*a*), the heating box (2*b*) is fixedly connected to the support frames (2*a*1), and the housing (2*a*) is made of a thermal insulating material.

2. The production apparatus for hydrothermal synthesis of lithium iron phosphate according to claim 1, wherein the second transfer assemblies (2*e*) are structurally identical to the first transfer assemblies (2*d*); the two second transfer assemblies (2*e*) each comprise an inlet pipe (2*d*1), an outlet pipe (2*d*2), and several transfer branch tubes (2*d*3), wherein the inlet pipe (2*d*1) and the outlet pipe (2*d*2) are both in a horizontal state and positioned at top and bottom of the heating box (2*b*), respectively; the several transfer branch tubes (2*d*3) are provided in a vertical state at equal distances and in parallel between the inlet pipe (2*d*1) and the outlet pipe (2*d*2), and all the transfer branch tubes (2*d*3) pass through the interior of the heating box (2*b*); the inlet pipes (2*d*1) of the two first transfer assemblies (2*e*) are communicated with the two first stirring devices (1), respectively; the two feeding pumps (2*c*) are positioned between the two first stirring devices (1) and the inlet pipes (2*d*1) of the two first transfer assemblies (2*e*), respectively; the two outlet pipes (2*d*2) are both communicated with the second stirring device (3); a cleaning assembly (2*f*) is provided next to the housing (2*a*), and the cleaning assembly (2*f*) comprises a water storage tank (2*f*1), an inflow tube (2*f*2), an outflow tube (2*f*3), a waste water tank (2*f*4), four first reversing valves (2*f*5), and four second reversing valves (2*f*6), wherein the four first reversing valves (2*f*5) are respectively sleeved onto the inlet pipes (2*d*1) of the two first transfer assemblies (2*d*) and the two second transfer assemblies (2*e*), at the end near the first stirring device (1); the water storage tank (2*f*1) is positioned next to the first stirring device (1); one end of the inflow tube (2*f*2) is communicated with the water storage tank (2*f*1), with the other end of the inflow tube (2*f*2) extending to below the four first reversing valves (2*f*5), and the four first reversing valves (2*f*5) are all communicated with the inflow tube (2*f*2); the four second reversing valves (2*f*6) are respectively sleeved onto the outlet pipes (2*d*2) of the two first transfer assemblies (2*d*) and the two second transfer assemblies (2*e*), at an end near the second stirring device (3); the waste water tank (2*f*4) is positioned next to the second stirring device (3); one end of the outflow tube (2*f*3) is communicated with the waste water tank (2*f*4), with the other end of the outflow tube (2*f*3) extending to below the four second reversing valves (2*f*6), and the four second reversing valves (2*f*6) are all communicated with the outflow tube (2*f*3).

3. The production apparatus for hydrothermal synthesis of lithium iron phosphate according to claim 2, wherein detection assemblies (2*g*) are provided on both of the two first transfer assemblies (2*d*) and the two second transfer assemblies (2*e*), and all the detection assemblies (2*g*) comprise four temperature sensors (2*g*1), four third reversing valves (2*g*2), four one-way valves (2*g*3), and four reflux tubes (2*g*4), wherein the four temperature sensors (2*g*1) are respectively sleeved onto the outlet pipes (2*d*2) of the two first transfer assemblies (2*d*) and the two second transfer assemblies (2*e*), at the end near the second stirring device (3); the four third reversing valves (2*g*2) are sleeved next to the temperature sensors (2*g*1); the four reflux tubes (2*g*4) are all in a vertical state and respectively sleeved above the four third reversing valves (2*g*2); the four one-way valves (2*g*3) are sleeved on top ends of the four reflux tubes (2*g*4), and the other ends of the four one-way valves (2*g*3) are communicated with the inlet pipes (2*d*1) of the two first transfer assemblies (2*d*) and the two second transfer assemblies (2*e*), at an end distal to the first stirring device (1).

4. The production apparatus for hydrothermal synthesis of lithium iron phosphate according to claim 2, wherein the heating box (2*b*) comprises four heating modules (2*b*2), wherein the four heating modules (2*b*2) are provided in parallel inside the housing (2*a*); two first heating tubes (2*b*1) are provided within each heating module (2*b*2); the transfer branch tubes (2*d*3) of the two first transfer assemblies (2*d*) and the two second transfer assemblies (2*e*) are respectively positioned between the two first heating tubes (2*b*1) of the four heating modules (2*b*2).

5. The production apparatus for hydrothermal synthesis of lithium iron phosphate according to claim 2, wherein a pressure relief assembly (2*h*) is provided on both of the two first transfer assemblies (2*d*) and the two second transfer assemblies (2*e*), and the pressure relief assembly (2*h*) comprises an exhaust tube (2*h*1), a waste gas tank (2*h*2), a pressure relief valve (2*h*3), and four connecting tubes (2*h*4), wherein the four connecting tubes (2*h*4) are respectively positioned between the outlet pipes (2*d*2) of the two first transfer assemblies (2*d*) and the two second transfer assemblies (2*e*), and the second stirring device (3); the exhaust tube (2*h*1) is provided in a horizontal state above the four connecting tubes (2*h*4), and the four connecting tubes (2*h*4) are all communicated with the exhaust tube (2*h*1); the waste gas tank (2*h*2) is positioned next to the housing (2*a*); the exhaust tube (2*h*1) is communicated with the waste gas tank (2*h*2).

6. The production apparatus for hydrothermal synthesis of lithium iron phosphate according to claim 1, wherein a rotating drive motor (1*a*) is provided on respective top of the first stirring device (1) and the second stirring device (3); a rotating shaft (1*b*) arranged in a vertical state is provided below each rotating drive motor (1*a*) of the first stirring device (1) and the second stirring device (3), and the rotating shaft (1*b*) is in transmission connection with the rotating drive motor (1*a*); several stirring blades (1*c*) surrounding an axis of the rotating shaft (1*b*) are provided on each rotating shaft (1*b*) of the first stirring device (1) and the second stirring device (3).

7. The production apparatus for hydrothermal synthesis of lithium iron phosphate according to claim 6, wherein several second heating tubes (3*a*) surrounding a central line of the second stirring device (3) are further provided within the second stirring device (3).

8. The production apparatus for hydrothermal synthesis of lithium iron phosphate according to claim 1, wherein the second stirring device (3) is provided with a discharge tube (3*b*) communicated with the drying device (4); a filter screen (4*a*) is provided within the drying device (4); a liquid outlet tube (4*b*) is provided below the filter screen (4*a*).

\* \* \* \* \*